No Printed Specification Available
9149X
M. Davenport,
Horse Power.
Patented Oct. 10, 1835.
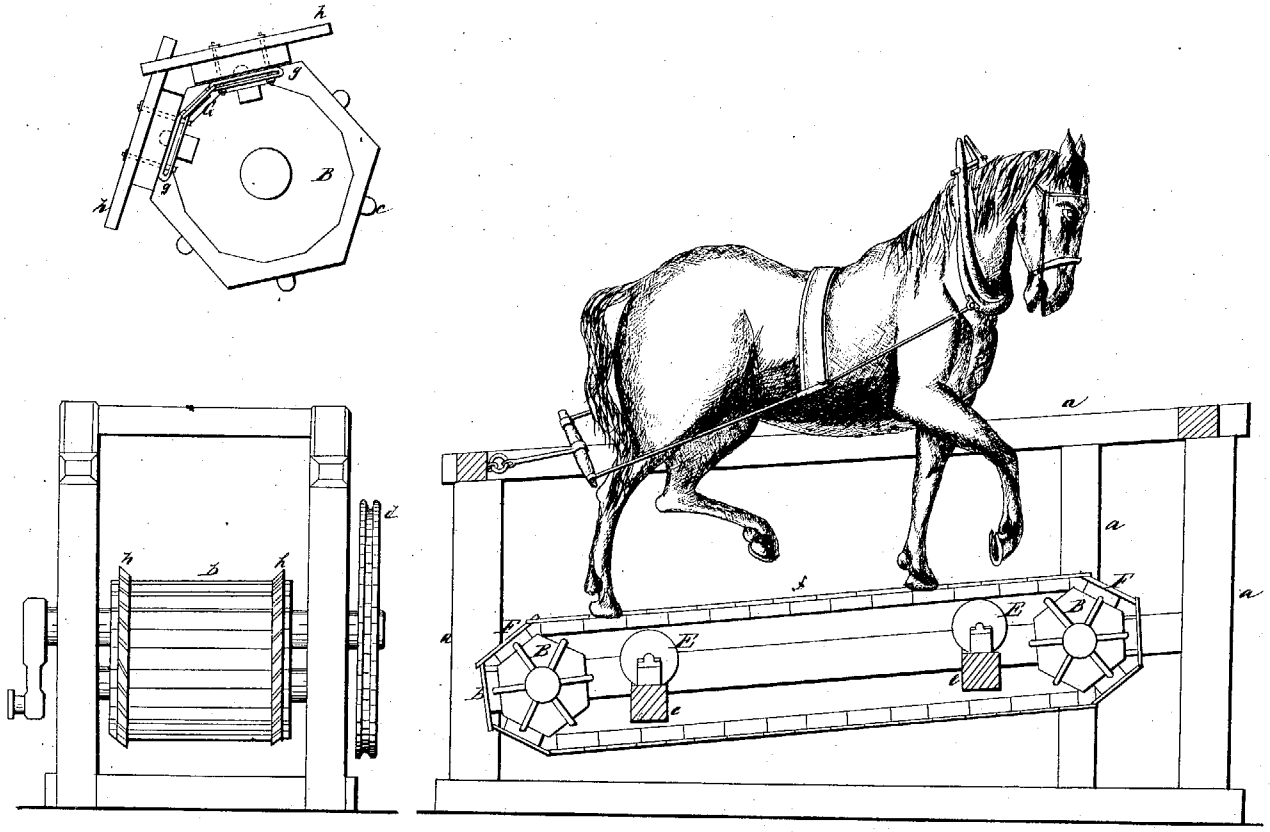
AM. PHOTO-LITHO. CO. N.Y. (OSBORNE'S PROCESS)

Moses Davenport's Letters Patent

The Schedule referred to in these Letters Patent and making part of the same containing a description in the words of the said Moses Davenport him self of his improvement in the horse power for propelling Machinery To all to whom these Presents shall come Be it known that I Moses Davenport of Philips in the County of Somerset and State of Maine have invented a new and useful improvement in the "Horse Power" Machine and that the following is a full and exact description of the construction and operation of the said Machine as invented or improved by me. A frame is to be constructed of suitable timber to be about Eleven feet in length by about three feet and eight inches in width (and as there is to be an inclination throughout the length, the lower end may be about five feet high and the taller one six; from the sides to the ends there will be braces to steady the frame. At each end of this inclined frame, are to be placed cylinders or rollers, one at each end, constructed by placing at each end of an iron axle or shaft upon which the cylinder is to be revolved, a circular head of say, about three inches wide connected with the opposite one by means of cross bars passing between and let into each. These heads are laid off into two parts on the circumference, one of which on the outside is formed into a six or more sided figure or hexagon, the other into a twelve or more sided or duodecagon on which the links and bands of the chain are to run, while the first is intended for the main bars (across the chain) to work on & will be about sixteen inches in diameter the cylinder being about three feet long). On the out side of each head is to be secured on to each side of the hexagon, a bar extending from the centre as a radius far enough beyond the circumference to form a tooth or cog on which the main bar is to drop (and work; in the inside also an iron and a bolt passes through the axle and is secured up each side on the head as a stay for it & the axle. The cylinder at the top of the frame has on the outside of one end a large pulley either for a single or double band) about four feet in diameter and at the other Drawing Made a crank; the ayles play in boxes secured on to the side pieces of the frame which
are placed nearly half way up the perpendicular posts. Between these
cylinders are placed, (and at a that distance from each two cross pieces extend-
ing from side to side. On these are placed lengthwise & side by side two
setts of rollers; made by setting up two narrow pieces edgewise from three
to six inches apart having friction rollers of that length & six or seven in
diameter between them, whose iron ayles turn in these said narrow piec-
es, the ends of which rest on the cross pieces abovementioned. Around these
two cylinders, is to revolve an endless chain or jointed platform, construct
ed in the following manner intended .. for the horse or horses to walk on,
Main bars or broad flat cross-pieces are to be provided of about three feet or
such length as to reach from outside cog to the same on the opposite (end of
the cylinder & to be about six or more inches wide (and about one inch thick,
as many in number as will reach around the cylinders (and space be-
tween them these are to be connected by means of a chain formed by screw-
ing on to each under side, and near each end a bent strap of iron about
five inches long when doubled over at each end thereof, so as to enclose a
square link of chain by one of its sides; and which is also to be so placed
that the centre thereof is between the adjoining bars so that one half of
the link rests beneath one and the other half beneath the other bar. The
other end of the strap encloses another square link situated in the same
manner; to which is again attached another strap & so on, thereby form-
ing a continued chain around the cylinders and beneath the main
bars a chain being adapted to each end of the cylinder to work over that
part thereof which forms the twelve sided figure and thus forms the connect
ing joint between the main bars; — Each bent or doubled strap being screw-
ed to the bar at the two ends in which are enclosed the sides of the square
links. Above or on the top of the bars (and immediately over the chain is
disposed all along the line thereof a row of diamond shaped .. cleats or
supports one to each bar, they are placed in a continued row side by side, the
length of each one such as to extend across the width of each main bar & half
or nearly so over each adjoining one but the direction of the length is to be oblique
which (as the ends are to be cut off in a line parallel with the ends of the main bars) give the diamond appearance — Each cleat is attached
to its bar by two screws which are to be one and the same as those used to
fasten on the double straps — the screw being long enough to go through the
strap, the bar & the cleat, and in this way I form & support an endless
chain or jointed platform which is able to rest on the double row of fric
tion rollers bearing against the under side of the top part of this chain or
platform. Between two cross pieces forming the tops at the ends of the main.
frame is laid parallel with the sides, two long bars at a sufficient distance
apart for a horse to travel between them & to reach about as high as his
sides intended to secure the breeching to & to steady his motions, or it may
be adapted for many). The end of each main bar of the platform, have a
sufficient width mortised out of the centre to receive the cogs on the out-
side of the head, to drop into them as the platform moves on which en-
sures the turning of the cylinders. Operation. The horse or horses, being plac-
ed on the platform & secured to the breeching hooks, the motion produced by
walking on travelling bars placed on the tops of the main bars to preserve them
from wear sets the jointed platform in motion and the weight of the animal
power is sustained by the double set of friction rollers beneath, & also by the
diamond cleats above the platform. The links connected by the iron straps form
a chain of joints to the main bars and revolve <u>round</u> the twelvesided figure
of the cylinder heads while the cogs which project from these heads are caught
by the mortises in the main bars and consequently brought <u>round</u> with them
which gives the desired motion to the said cylinders — A leather belt may
be used instead of the chain & fastened on to the main bars by means of two
screws in the same line of the length of the bars situated near the front edge of
the mortise; or that first presented to the cog so as to keep it down steady
to the cog & each belt has that part of the head it is to work over made in
to a circular form, the strength of it being equal (where two are used) to about
that of a thoroughbrace to a carriage spring and the width may be from two to
three inches & small pieces of sheet iron at the insertion of each screw head
in order to prevent its tearing through the leather. The front cylinder as
it gives motion to the crank at one end & to the band wheel at the other
by which the power is continued on to the Machinery intended to be dri[illegible]

9149X ed. In testimony that the above is a full and exact description of the construction and modes of operation of my improvement as invented or combined by me I have hereunto set my hand this twenty sixth day of August Eighteen hundred and thirty five. — And what I claim as my invention therein and not previously known or used is the method of construction or combination by which I have put together the several parts of the jointed platform — of the cylinder heads & of the two sets of friction rollers.

Witnesses

Cpd. C. H. W. Wharton
W. C. (Henry) Stone

Moses Davenport (1648 words)